Oct. 18, 1966   L. H. ROUSSELET   3,279,657
POWDERED INSECTICIDE OR FERTILIZER DISTRIBUTION DEVICE
Filed March 15, 1965
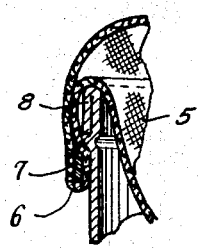
Fig. III
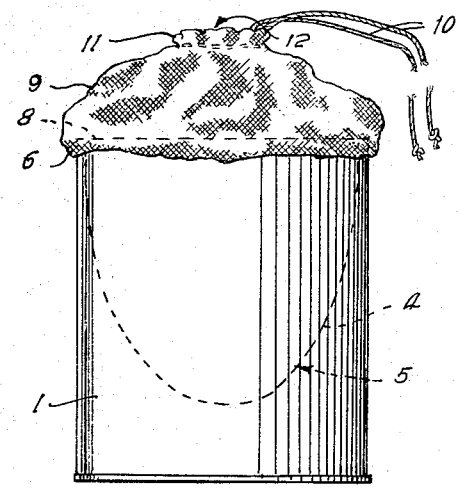
Fig. I
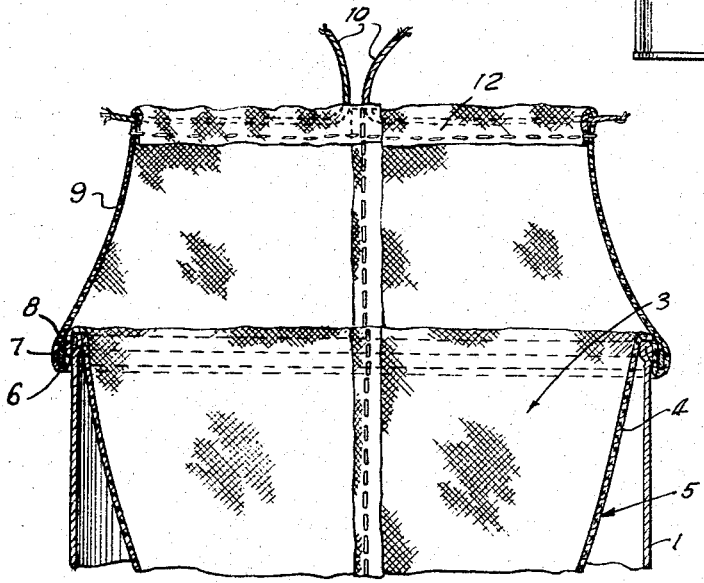
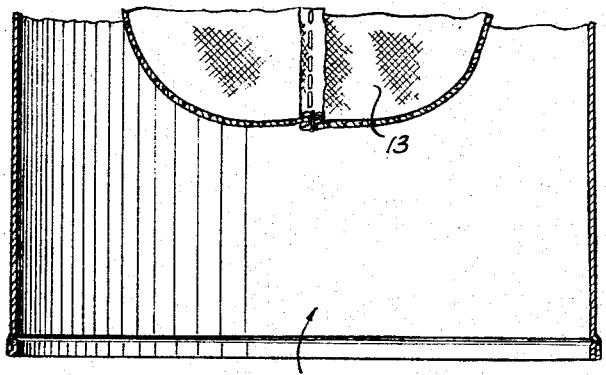
Fig. II
INVENTOR
Leroy H. Rousselet
BY Howard E. Moore
ATTORNEY United States Patent Office 3,279,657
Patented Oct. 18, 1966

3,279,657
POWDERED INSECTICIDE OR FERTILIZER DISTRIBUTION DEVICE
Leroy H. Rousselet, Dallas, Tex., assignor to Pogo Tool Corporation, a corporation of Texas
Filed Mar. 15, 1965, Ser. No. 439,878
3 Claims. (Cl. 222—183)

This invention is concerned with a device for distributing powdered or granular insecticide or fertilizer material and is particularly concerned with such a device wherein the material is confined within an enclosure while being dispensed, which directs the insecticide or fertilizer within a certain confined area to prevent wastage thereof.

Distributors and spreaders for powdered insecticide and fertilizer materials have customarily comprised a vehicle with a container thereon from which the fertilizer is distributed from the lower side thereof as the vehicle is pushed over the area where the fertilizer or insecticide is being distributed; or it was packaged in a can or like container having perforations or openings in the top thereof from which it was dispensed by shaking the can or container.

In the use of both such distribution methods considerable wastage of the powdered material was occasioned by the fact that it was blown away by the wind, and was not directed within a confined area as it was dispensed.

The present invention is intended to provide a powdered fertilizer or insecticide dispenser apparatus which permits the fertilizer or insecticide material to be deposited within a confined area directly upon the lawn or other surface without being blown away by the wind, and without unduly scattering same. It may be employed to dispense powdered insecticide or fertilizer material on shrubs or the like, or it may be tied on the lawn mower or other vehicle in position so that it may engage the ground as the lawn mower or vehicle moves therealong to provide sufficient agitation to cause the powdered material to be dispensed therefrom and directed onto the surface of the area where it is applied.

It is, therefore, a primary object of the invention to provide a dispenser for powdered insecticide or fertilizer material which directs same in a predetermined pattern and confines same to a desired area to prevent the wastage of the fertilizer or other powdered material.

It is another object of the invention to provide such a fertilizer or insecticide distributing device which may be attached to the lawn mower or other vehicle traversing the lawn surface in position so that it will drag along the surface of the lawn and as it does so, will shake out the fertilizer, insecticide, or other powdered material within a confined area.

Still another object of the invention is to provide a dispenser for powdered fertilizer or insecticide material comprising a porous, flexible container having its lower end suspended in an annular shell or housing which is open at its lower end, the upper end of the container being openable and closeable by a suitable drawstring or other retainer means, so that powdered fertilizer or insecticide material may be placed therein and enclosed within the container and dispensed by either shaking the device up and down to dispense the material from the open end of the shell, or which may be attached to a lawn mower or other vehicle and dragged along the surface of the ground to cause the material to be dispensed from the container within a confined area.

A general object of the invention is to provide a dispenser for powdered insecticide or fertilizer material which is simple in construction, yet is very effective and utilitarian in function, which is economical to manufacture, and which results in the saving of fertilizer or insecticide material dispensed thereby.

Other and further objects of the invention will become apparent upon reading of the detailed specification hereinafter following and by referring to the drawing annexed hereto.

A suitable embodiment of the invention is shown in the attached drawing wherein, FIGURE I is a side elevational view of a device incorporating the invention with the drawstring closed at the top;

FIGURE II is a cross-sectional elevational view of the dispenser device with the drawstring open; and FIGURE III is an enlarged fragmentary cross-sectional elevational view showing the attachment of the porous distributing container to the upper edge of the rigid shell by means of an expandible ring extended thereabout.

Numeral references are employed to designate the various parts shown in the drawing and like numerals indicate like parts throughout the various figures of the drawing.

The numeral 1 indicates a tubular shell or housing which may be made of relatively stiff metal, plastic or other suitable material.

The lower end of the shell 1 is open, as indicated at 2. The upper end of the shell 1 is also open as indicated at 3.

A fabric container 4, which is preferably made of coarse mesh, porous fabric material, such as coarse mesh, woven burlap material, has a lower depending portion 5 attached to the upper beaded rim 8 of the casing or enclosure 1.

The fabric container 4 includes an upwardly extending portion 9. The porous container member 4 takes the form of a sack and may be attached to the upper rim of the enclosure member 1 by extending the lower portion 5 into the casing 1, turning the upper portion 9 downwardly over the bead 8 extending about the upper edge of the casing 1, and stretching an elastic ring 7 thereabout to clamp the material of the sack 4 in place underneath the bead 8. The ring 7 may be made of rubber or plastic or it would be a flexible split metallic ring which could be stretched and released about the rim of the casing underneath the bead 8 to clamp the material of the sack 4 thereto.

After the material of the sack 4 has been clamped in place, the upper portion 9 may be turned upwardly over the ring 7 to provide a secure anchor for the sack 4 to the casing 1.

A hem 12 is provided about the upper edge of the sack 4 through which is extended a drawstring 10 which may be employed to draw the upper edge of the sack 4 together to close same, as indicated at 11.

The operation and function of the device hereinbefore described is as follows:

Powdered or granular insecticide or fertilizer material is placed in the pocket provided by the lower portion 5 of the porous inner container 4. The drawstring 10 is drawn together to gather the upper hem 12 of the sack 4, as indicated at 11, to thereby confine the material therein.

The material may be shaken out through the pores 13 provided by the coarse mesh of the lower portion 5 of the sack 4, by agitating it up and down or sidewise. The material thus dispensed is confined within the casing 1 and passes out through the open end 2 to direct it to the area intended.

Another use of the device is to tie same to the handle or frame of a lawn mower by means of the drawstring 10 or otherwise suspend it, and allow the device to suspend therefrom in position so that the lower open end thereof will just touch the ground and be dragged thereover. As the device is thus dragged over the ground, as the lawn mower is moved forward, the jostling motion imparted thereto will shake the fertilizer or insecticide material through the pores of the sack 4, and the casing 1 will direct same against the surface over which the device is moving and confine same to the intended area of application.

The device can be made so economically, that it can serve as a container for the insecticide or fertilizer in which it is sold. A temporary closure such as a snap-on lid could be placed over the lower end of the casing 1 and removed before the device is used to dispense the fertilizer or insecticide material. The device could then be reused to dispense additional material.

Thus, there has been provided a convenient and economical container for powdered or granular fertilizer or insecticide material which may be employed to dispense same in a directed pattern on the intended surface. There has been provided such a device which is simple and economical to manufacture, and is easy to use.

It will be understood that other and further embodiments of the invention may be made without departing from the spirit and scope of the appended claims.

Having described my invention, I claim:

1. In a device of the class described; a tubular shell open at both ends thereof; a sack-like member made of relatively coarse mesh fabric, the said sack-like member being secured intermediate its ends to the rim at one end of the shell with the closed end of the sack-like member suspended in said shell and the other openable end of said sack-like member being extendable beyond the end of the shell; and means to close the openable end of the sack-like member.

2. The combination called for in claim 1 wherein the means to close the end of the sack-like member is a drawstring by which the device may be suspended.

3. The combination called for in claim 1 with the addition of means to secure the sack-like member to the end of the shell comprising, an expandable elastic ring disposed about a portion of the sack-like member folded over the rim of the shell.

References Cited by the Examiner

UNITED STATES PATENTS

| | | | |
|---|---|---|---|
| 395,551 | 1/1889 | Dilworth | 222—189 X |
| 1,086,150 | 2/1914 | Frampton | 239—553.3 |
| 2,262,628 | 11/1941 | Wilson | 222—189 |

FOREIGN PATENTS

| | | |
|---|---|---|
| 24,443 | 11/1898 | Great Britain. |
| 338,933 | 7/1959 | Switzerland. |

ROBERT B. REEVES, *Primary Examiner.*

W. SOBIN, *Assistant Examiner.*